E. HERZIG.
Scroll-Sawing Machine.
No. 168,995. Patented Oct. 19, 1875.
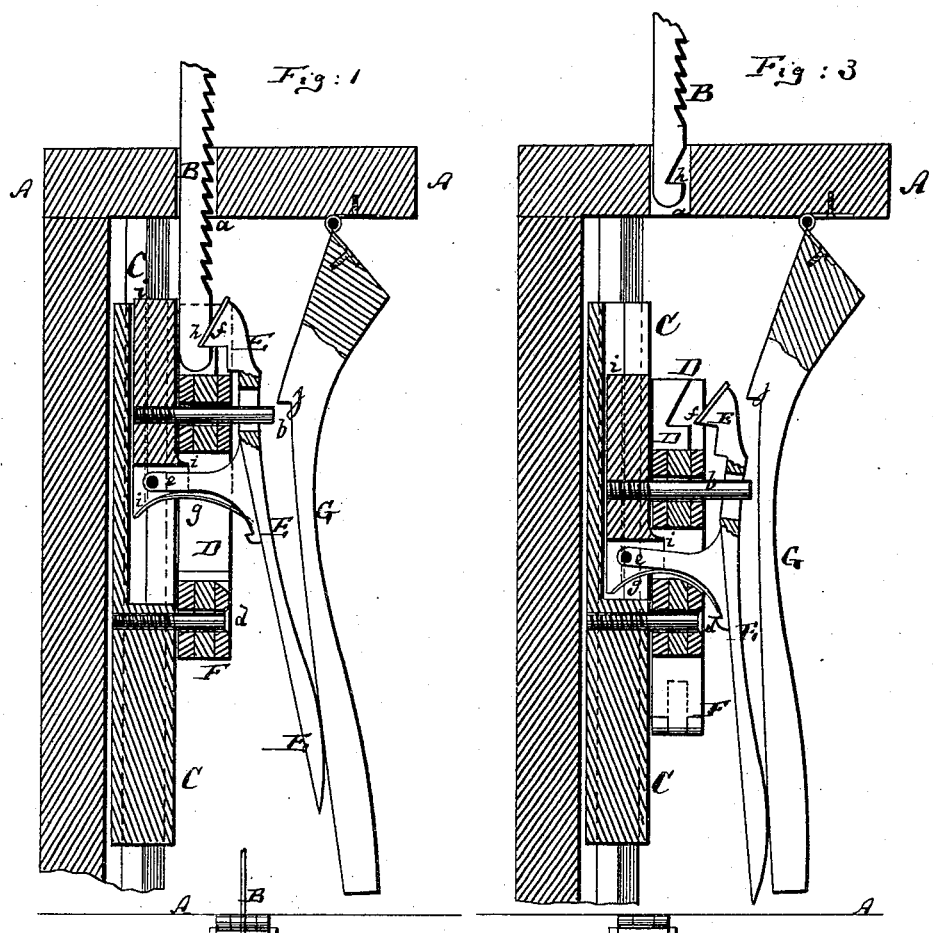

UNITED STATES PATENT OFFICE.

EDUARD HERZIG, OF JERSEY CITY HEIGHTS, NEW JERSEY.

IMPROVEMENT IN SCROLL-SAWING MACHINES.

Specification forming part of Letters Patent No. 168,995, dated October 19, 1875; application filed September 3, 1875.

*To all whom it may concern:*

Be it known that I, EDUARD HERZIG, of Jersey City Heights, in the county of Hudson and State of New Jersey, have invented an Improvement in Scroll-Sawing Machines, of which the following is a specification:

Figure 1 is a vertical transverse section, showing my improved saw-holder closed against the lower end of the saw. Fig. 2 is a face view of the same. Fig. 3 is a vertical transverse section of the same, showing the saw released and the holder opened. Fig. 4 is a face view of the holder opened.

Similar letters of reference indicate corresponding parts in all the figures.

The object of this invention is to produce for a scroll-sawing machine means for instantaneously disconnecting the lower end of the saw from the reciprocating holder which imparts motion to the saw, and means also for instantaneously and automatically relocking the lower end of the saw to said lower reciprocating holder, all without interfering with the motion of said holder.

My invention consists in applying a self-acting clamp to the reciprocating slide of the lower hanger or saw-holder, said clamp serving to take hold of the lower end of the saw whenever the same is inserted between its jaws, and to retain its hold until a lever is pressed upon it, when it will at once release its hold and let the saw fly up out of the table and out of the work under the influence of the tension-spring that is usually applied to the upper hanger.

In the accompanying drawing, the letter A represents the table of a scroll-saw, having a mortise, *a*, cut through it for the reception of the saw B. C is a reciprocating slide, connected, by a rod, with a crank-shaft or with any other suitable mechanism, whereby a reciprocating motion is continuously imparted to it, and during working-hours in a shop in which my saw may be placed it is not intended to ever arrest the reciprocating motion of the slide C. To the face of the slide C is applied a clamp for holding the saw. This clamp consists of three chief parts—being two jaws, D D, and a spring-lever, E. The jaws D D are, at a short distance below their upper ends, connected, by a pivot, *b*, with a vertical slide, *i*, that is sunk into a groove of or fitted between guides on the slide C. The lower ends of the jaws D D are connected to a toggle-joint, F, whose fixed pivot *d* has its bearings in the slide C. The lever E is, at *e*, (see Figs. 1 and 3,) pivoted to the slide *i*, and has its upper end shaped into a bevel, as shown at *f* in Fig. 1, for the purpose of fitting a beveled notch, *h*, in the lower part of the saw. A spring, *g*, bears against the lever E, and has the tendency to crowd the beveled end *f* toward the face of the slide C. When the toggle-joint F is contracted, as in Fig. 4, it serves to spread the upper ends of the jaws D D, and at the same time the beveled end of the lever E enters between these jaws and holds them apart. Meanwhile the entire clamp D D E moves up and down rapidly with the reciprocating slide C.

When the saw B is to be set in operation, said saw being continuously attached at its upper end to the upper hanger, its lower end is introduced through the mortise *a*, and, by pressing on the upper hanger, crowded down, so that it will enter between the separated upper ends of the jaws D D, and in so doing the saw arrives in contact with the beveled end *f* of the lever E, and crowds said end of the lever outward until, during the farther descent of the saw, the beveled end of the lever snaps into a similarly-shaped notch, *h*, of the saw, thereby attaching the saw to the slide. After the lever E has thus taken hold of the saw-blade, the first downward motion of the slide C will cause the saw which is attached to the upper hanger to draw the lever E, the slide *i*, and with it the pivot *b* of the jaws, up, and in so drawing the pivot *b* the arms of the toggle-joint F will be extended, as in Fig. 2, and the faces of the jaws D D closed against the lower end of the saw, thus holding the lower end of the saw completely clasped between the jaws D D and between the lever E and the face of the slide *i*. To the under side of the table A, or to any other stationary part, is pivoted a lever, G, which has a shoulder, *j*, formed on it.

When it is desired to release the saw from the jaws D D and lever E, it is only necessary to press the lever G against the lever E. The latter lever, taking part in the reciprocating motion of the slide C, cannot, of course, be bodily taken hold of by the operator; but in pressing the lever G against E the first effect is that the beveled end $f$ of the lever E will be swung off the saw, thus allowing the latter to be drawn up by the tension-spring of the upper hanger out of the mortise of the table; but the pressure of the lever G has one other object, to wit, that of reopening the jaws D D, so that they may be in proper position for taking hold of the lower end of the saw when the same same is to be again inserted. For this purpose the step $j$ is formed on the lever G, the effect of such step being to detain the pivot $b$ during the upward motion of the slide C, and by so detaining such pivot to cause the slide $i$ to slide down on the upwardly-moving slide C, and thereby to contract the toggle-joint F, spread the jaws, and insert the end $f$ of the lever E between them, all as indicated in Figs. 3 and 4. Thus it is that by simply introducing the saw between the jaws D D it will be automatically taken hold of and worked by the reciprocating slide C, and that, by pressing the lever G, the saw will at once be disengaged and the jaws set back into their open position, all without in the least interfering with the motion of the reciprocating slide C.

Instead of having the pin $b$ project for contact with the shoulder $j$, any other projection on the slide $i$, or on any of the parts connected therewith, may be used for contact with the lever G for the like purpose, and the shoulder $j$ on the lever G may be dispensed with whenever the said lever is applied at right angles to the lever E, so that one of the edges of G may come in contact with the stop or projection $b$. In fact, the details of the mechanism may be more or less varied without departing from the spirit of my invention.

I claim as my invention—

The combination of the jaws D D and toggle-joint F F with the reciprocating spring-lever E, sliding block $i$, projecting pin $b$, and stationary lever G, provided with the stop $j$, constructed as shown and described.

EDUARD HERZIG.

Witnesses:
 E. C. WEBB,
 A. MORAGA.